Patented Aug. 20, 1940

2,211,945

UNITED STATES PATENT OFFICE 2,211,945

ARTIFICIAL CELLULOSIC MATERIAL BONDED TO RUBBER AND METHOD OF PRODUCING THE BOND

William Hale Charch, Buffalo, N. Y., assignor, by mesne assignments, to E. I. du Pont de Nemours & Company, Wilmington, Del., a corporation of Delaware No Drawing. Application April 11, 1936, Serial No. 73,933

5 Claims. (Cl. 154—40)

This invention relates to the treatment of cellulosic materials to improve the adhesion thereof to natural rubber, compounded rubber, rubber substitutes and the like. More particularly, it relates to methods for obtaining improved adhesion between rubber and cellulosic threads, filaments, cords, fabrics, and the like, and the products resulting from such methods. This invention is especially applicable to artificial threads as will be explained more in detail below.

In the past it has been found that artificial threads such as regenerated cellulose threads, filaments, cords, or the like, adhere very poorly to compounded rubber stock when the two are united and the rubber stock subsequently cured according to any of the known processes which produce commercially satisfactory adhesion between rubber and cotton. This poor adhesion of artificial threads to rubber has constituted a very serious obstacle to their use in place of cotton in the manufacure of automobile tires, reinforced rubber belts and similar products consisting of alternate plies of rubber and cord which are required to adhere very strongly for long periods of time under drastic conditions of high temperature, constant flexing and bending, shock, etc. Artificial threads would frequently be preferable to cotton in such uses because of their higher tensile strength, especially at elevated temperatures and because of their continuous filament structure. If rayon cord, for example, is pressed into commercial rubber stock such as is customarily used in the manufacture of tires or belting and the whole is cured at high pressure and at an elevated temperature sufficient to completely vulcanize the rubber stock, it will be observed that the rayon cord can be pulled away from the rubber with comparative facility. Indeed, if subjected to a standard pull-out test which measures the force required to separate the cord from the rubber, rayon cord is found to adhere to rubber only approximately half as well as a similar cotton cord submitted to the same test.

It has now been discovered that certain materials, when applied to rayon cord, will very greatly improve its adhesion to rubber. It has also been found that the adhesion of rayon cord to rubber is still further improved if the adhesion promoting agent is combined with a dispersion of rubber or latex or a solution of rubber and applied to the cord. This invention enables the production of a rayon reinforced rubber structure at least equal to and usually better, insofar as adhesion of the cord to rubber is concerned, than similar rubber structures reinforced with untreated cotton.

It is an object of this invention to provide a method of securing improved adhesion between cellulosic material and rubber.

It is another object of this invention to provide a method for securing improved adhesion between rayon or other filamentous forms of regenerated cellulose and rubber.

A still further object of the invention is to produce artificial threads and plied structures made therefrom such as cords, comprising regenerated cellulose having a dry tenacity at room temperature (75° F.) in excess of 2.0 grams per denier, characterized in that rubber may be more firmly anchored to the rayon.

Other objects of the invention will appear hereinafter.

The objects of the invention are accomplished in general by applying to cellulose structures such as cellulosic threads and the like, a treating composition containing polyvinyl alcohol, and preferably also dispersed rubber or latex and/or materials which will set up to form a substantially insoluble, infusible, synthetic resin, whereby to improve the adhesion between the cellulosic thread and rubber after their combination and vulcanization to rubber.

In order to set forth more clearly and concisely the principles of the invention it will be described with particular reference to rayon made by the viscose process having a high dry tensile strength at room temperature (75° F.) of 2.0 grams or more per denier, and preferably of 2.5 grams or more per denier, in the form of heavy cords. It is to be understood, however, that any cellulosic filament, thread or cord produced by a wet process, that is, by coagulation from an aqueous cellulosic dispersion in an aqueous coagulating bath may be treated in accordance with the principles of the invention. Thus the invention includes the treatment of regenerated cellulose made by the cuprammonium or viscose process, of lowly esterified cellulose esters such as lowly acetylated cellulose acetate of lowly etherified cellulose such as lowly etherified glycol cellulose, lowly etherified methyl cellulose, lowly etherified ethyl cellulose, cellulose glycollic acid and the like.

The invention includes cords and fabrics of any type or construction made from such cellulosic threads or filaments. Obviously where a cellulose derivative such as cellulose acetate, which is thermoplastic in nature, is used, the temperature to which the material is subjected in the various steps of the process must be kept well below the softening point of the cellulose derivative. Furthermore, the materials with which the derivative is treated, must be so chosen that the steps of the process can be carried out at a temperature below the softening point of the cellulose derivative.

The preferred cellulosic material used in this invention is in the form of strong viscose rayon threads having a dry tensile strength at room temperature of above 2.0 grams per denier, prepared in the manner taught by H. H. Parker in copending patent application, Serial No. 676,463, filed June 19, 1933, or in the form of twisted structures, such as strands or cords plied to said strong rayon thread.

As the rubber to which such cellulosic thread structures will adhere, the invention contemplates any compounded natural rubber stock or any compounded synthetic rubber stock such as polymerized isoprene, or polymerized butadiene, or polymerized halogen substituted butadienes such as halogen-2-butadiene 1,3 polymer, e. g. chloro-2-butadiene 1,3 polymer, and other types. Moreover, the rubber may contain any desired vulcanizers, stabilizers, accelerators, et cetera, singly or in any desired combination. In its preferred and common form the invention contemplates any commercial compounded rubber stock such as is commonly employed in the fabrication of automobile tires, hose, raincoat material, shoes, belting such as conveyor belts, fan belts or other driving belts, or the like.

The term "rubber," unless otherwise modified, as used in the specification and claims, is intended to be used in its generic sense to include rubber substitutes, natural rubber, compounded rubber, synthetic rubbers, and the like.

As a means for improving the adhesion of the cellulosic thread structure to rubber this invention contemplates polyvinyl alcohol particularly when used together with rubber latex, with a substantially insoluble, infusible synthetic resin, or together with both rubber latex and a substantially insoluble, infusible synthetic resin. The synthetic resins suitable for this invention are preferably resins formed by the reaction between an aldehyde and some other compound capable of condensing or polymerizing with an aldehyde to a substantially insoluble, infusible form, all of which other compounds are water-soluble at least to the extent of from 2% to 5% by weight and capable of condensing, polymerizing or setting up rapidly and completely to a substantially insoluble, infusible form at a temperature of 250° F. or less such as cord is generally subjected to during the drying and vulcanizing or curing operations in the manufacture of tires, fan belts and the like.

As the materials capable of combining with aldehyde to yield insoluble, infusible resins possessing the above stated qualifications and therefore particularly satisfactory for use in the operation of this invention may be mentioned polyphenols, ketones, aromatic amines, amides similar to cyanamide, urea or urea derivatives and the like. As the polyphenols particularly satisfactory for use may be mentioned those having the hydroxyl groups in the benzene nucleus meta with respect to one another such as resorcinol, phloroglucinol, orcinol and the like. As the ketones particularly suitable for use in the operation of this invention may be mentioned simple aliphatic ketones such as acetone, mixed aliphatic ketones such as methyl ethyl ketone, hydroxy aliphatic ketones such as diacetone alcohol, aromatic ketones such as benzophenone, mixed aliphatic aromatic ketones such as phenyl methyl ketone, hydroxy aromatic ketones such as p-dihydroxy benzophenone and other organic compounds containing the ketone group. As the aromatic amines particularly suitable for use in the operation of this invention may be mentioned amine derivatives of benzene such as aniline, dimethyl aniline, p-amino dimethyl aniline, phenylene diamine, diphenyl amine and the like. Likewise amine derivatives of naphthalene are suitable for use such as B-naphthyl dimethyl amine, diamino naphthyl amine and B-naphthyl amine. As the amides similar to cyanamide particularly suitable for use in the operation of this invention may be mentioned dicyandiamide, cyanoacetamide, alkyl cyanamides such as methyl or ethyl cyanamide, alkyl melamines such as trimethyl melamine and other amides. As the urea derivatives particularly suitable for use in the operation of this invention may be mentioned thiourea, dimethylol urea, alkyl derivatives of urea such as methyl or ethyl urea, acyl derivatives of urea such as acetyl urea and other urea derivatives.

The preferred concentration of these resin-forming materials is between 0.5% and 5% by weight. It is understood that these compounds may be used singly or in any desired combination with one another and that also this invention is not limited to the specific resin-forming compounds mentioned.

The materials to be condensed with aldehyde to form the resin and having a lower solubility than 2% by weight can be employed in the form of aqueous dispersions. Those materials which react rather slowly with aldehydes at the temperatures commonly used in this invention can often be caused to partially condense or polymerize with the aldehyde before application to the rayon thus lessening the time subsequently necessary for substantially complete polymerization. Moreover if desirable the time or temperature or both of drying the cord after passing through the aqueous solution of resin-forming materials combined with polyvinyl alcohol alone or together with latex, or the time or temperature or both of curing or vulcanization may be varied from those ordinarily used in manufacturing tires, fan belts and the like in order to insure complete condensation or polymerization of less readily reactive resin-forming combinations. It is, however, easily possible and usually preferable according to this invention to select for use in improving adhesion, resin-forming materials which can be satisfactorily applied to current commercial processes without necessitating any essential changes in procedure.

Where resin-forming materials are used, frequently it is desirable to add a small amount of catalyst or condensing agent for the resinification reaction. Such catalysts or condensing agents are usually materials which are basic in nature. Of these sodium hydroxide is most commonly employed and may be added in any desired amount according to the special character of the solution in which it is to be used, although amounts are preferred between 0.02% and 0.8% by weight. Where latex is to be used in combination with the resin, the amount of sodium hydroxide should be preferably between 0.15% and 0.30%. The amount of alkaline catalyst may be more specifically determined by the pH required or desired in the solution of resin-forming materials and dispersed rubber or latex. It may be desirable to adjust the pH of the resin solution so that it will be approximately the same as the pH of the dispersed rubber or latex solution in which it is used. Thus, the amount of alkaline catalyst which is used may be determined by the amount required to bring the pH of the solution to some predetermined value, as for instance 8.5 to 9. Instead of sodium hydroxide, potassium hydroxide may of course be used, or any other suitable alkaline condensing agent.

While treatment of a cellulosic thread structure, especially rayon, with such an aqueous solution of polyvinyl alcohol as has been described greatly improves the adhesion of said cellulosic structure to rubber, it is preferred, according to this invention, to employ the treatment with an aqueous solution of polyvinyl alcohol with or without the resin-forming materials in combination with a rubber or latex treatment as giving still more marked improvement in adhesion. This may be accomplished in a number of ways, the simplest and most convenient of which contemplates the combination of aqueous dispersions of rubber or latex, whether artificial, natural, vulcanized or compounded, with the aqueous solution of polyvinyl alcohol before application to the cellulosic thread structure. The latex or rubber may be present in the solution for treating the thread in any desired proportion although commonly the improvement in adhesion is most marked when such concentrations of rubber or latex are used that the percentage of rubber solids in the solution is between 2% and 25% by weight and preferably between 5% and 15% by weight. If a natural latex dispersion is used, it may be either crude latex, a creamed latex, that is to say, a latex from which certain soluble materials such as sugars, acids, soluble resins, soluble proteins, etc. have been removed, or one which contains added materials, or one which has been treated to change the character of the rubber in it. Furthermore, it may contain any desired accelerators, vulcanizers, stabilizers, dispersing agents, or any other substances such as are commonly employed in the rubber industry. When rubber is used as an artificial dispersion in water of either natural rubber or of any known synthetic rubber, it may likewise contain additionally such substances as rubber accelerators, vulcanizers, stabilizers, dispersing agents, and the like. The type or kind of rubber dispersion or rubber latex to be used depends to some extent upon the type or kind of rubber stock to which it is desired to bond the treated rayon. For example, to obtain good adhesion between treated rayon and synthetic rubber composed of chloro-2-butadiene-1,3 polymer, it is preferable to treat the rayon with an aqueous dispersion of polyvinyl alcohol with or without the resin-forming materials, in combination with chloro-2-butadiene-1,3 polymer latex. The thread-treating composition may also contain other materials such as casein, glutinous materials, water-soluble adhesives, wetting agents, and the like, which may be added as adhesives, stabilizers or for a variety of purposes without departing from the fundamental principle of this invention.

Variations in the procedure for preparing an aqueous solution containing polyvinyl alcohol with or without resin-forming materials, catalysts and/or dispersed rubber, may be employed depending on the character of the final adhesive composition or upon the proportions of components or upon the specific components used in preparing the adhesive. A simple and convenient method consists in dissolving the polyvinyl alcohol, the resin-forming components, and the catalyst in water and stirring the solution into the aqueous dispersion of rubber. In certain cases, it may be desirable to employ instead of a freshly prepared solution of the resin-forming materials, a solution containing the polyvinyl alcohol and the partially polymerized resin, the latter being prepared by permitting the resin-forming components, e. g. resorcinol and formaldehyde, together with the catalyst to stand at ordinary temperatures, e. g. 25° to 30° C. for several hours until a partial polymerization occurs, or alternatively the time of partial polymerization can be shortened by using a higher temperature. The use of the partially polymerized resin solution is preferred in certain cases such as for example in case a high solids concentration of resin-forming material and latex, together with polyvinyl alcohol, is desired, at which concentrations, the resin-forming components, if not partially condensed and/or polymerized, might have a tendency to coagulate or precipitate the latex to which they are added.

Instead of applying dispersed rubber or rubber latex to the cord together with the polyvinyl alcohol in a single step from an aqueous solution which contains the dispersed rubber or rubber latex and the polyvinyl alcohol with or without the resin-forming material, this invention also contemplates as a method for improving the adhesion of rayon to rubber, the steps of treating the rayon with an aqueous solution of polyvinyl alcohol with or without the resin-forming ingredients, subsequently drying the cord at a temperature sufficient to cause the polymerization of the resin and then treating the resulting cord with a solution of rubber in toluene or other suitable rubber solvent, drying the so treated cord to evaporate the solvent so that the cord has a coating of adhesive and on that a coating of rubber. The rubber solution may be a solution of either natural or synthetic rubber and may be either raw rubber or rubber compounded with the usual accelerators, vulcanizers, stabilizers and the like which are commonly added to rubber or of rubber degraded, oxidized or otherwise modified.

Other variations in the method of applying to rayon cord polyvinyl alcohol and rubber or rubber latex to improve the adhesion of the cord to rubber are also possible according to this invention. For instance, the cord may be first treated with an aqueous solution of polyvinyl alcohol with or without added resin-forming material and dried at a polymerizing temperature, the cord then being treated with an aqueous solution containing rubber latex and polyvinyl alcohol with or without resin-forming materials. Or the rayon may be given two treatments, the first with an aqueous solution of the polyvinyl alcohol and dispersed rubber with or without resin-forming material, and then with the same aqueous solution or with a different solution containing polyvinyl alcohol and dispersed rubber and containing a different ratio of rubber latex to the other solids. It is understood that after each aqueous treatment the cord is dried before the application of the next successive treatment.

The application of the aqueous solution of polyvinyl alcohol with or without the added modifying agents to rayon cord or fabric may be accomplished in a number of ways. For example, the rayon cord or fabric may be passed through the composition contained in a tank, then between two doctor knives or squeeze rolls to remove the excess composition from the cord or fabric and then over a series of drier rolls maintained at a temperature sufficiently high to dry out the cord or fabric and to condense or polymerize the resin. Other equally suitable means for applying the composition to rayon cord or fabric may be employed such as by means of transfer rolls, by spraying, by brushing, etc. Likewise, drying of the treated rayon and/or fabric may be accomplished in other ways such as for example by means of a belt or frame carrying the treated rayon cord or fabric through a heated closed chamber, etc.

If rayon tire cord, treated with the aqueous adhesive composition and dried at an elevated temperature in the manner described, is placed upon a commercial compounded rubber stock such as is customarily used in the manufacture of tires and the whole is cured at high pressure and elevated temperature to vulcanize the rubber stock completely, the treated rayon is found to adhere strongly to the rubber. Indeed, if the cord is subjected to a standard pull-out test which measures the force required to separate the cord from the rubber, it is found that the adhesion between the treated rayon and rubber is at least equal to and often greater than that obtained between cotton and rubber. If the treated rayon cord is subjected to a standard pull-out test at an elevated temperature, for example at 270° F. to measure the adhesion between the cord and rubber at this temperature, the adhesion is found to be at least equal to and often better than the adhesion of cotton cord to rubber at this temperature, a fact which is of the utmost importance in the construction of tires, fan belts and similar articles which develop a high temperature under ordinary conditions of usage.

In addition to improving the adhesion of rayon to rubber, the present invention greatly increases the length of time a pad consisting of plies of cords treated in accordance with this invention to which a skim coat of compounded rubber stock has been applied and the whole subjected to sufficient pressure and temperature to completely vulcanize the rubber, may be flexed and bent under tension before separation of the plies takes place. For example, where such a pad prepared from untreated rayon may be flexed 2,000 times and a similar pad prepared from untreated cotton may be flexed 17,000 times before separation of the plies takes place, a similar pad prepared from rayon treated in accordance with this invention may be flexed 23,000 times before separation of the plies takes place.

In addition to the foregoing advantages, the treatment of rayon cord or fabric according to the present invention, does not alter the color of the rayon appreciably nor does it excessively stiffen or harden the cord or fabric. Other advantages are the ease with which the treatment may be applied to rayon cord or fabric which makes unnecessary any changes in equipment in current commercial processes in use for the treatment of fabrics or individual cords, and the cheapness and ready availability of these raw materials.

Moreover, rayon cords treated according to this invention and combined with rubber show good resistance to known fatigue tests.

Fatigue resistance of tire cord may be measured in a variety of ways, for example, the cord may be subjected for a fixed number of flexings to drastic conditions of flexing and simultaneous stretching either at an elevated temperature, conditions which are designed to approximate those encountered during the actual use of tires. The tensile strength of the cord after the prescribed flexing or bending and stretching, compared with the tensile strength before the test, gives one measure of the fatigue resistance of the cord. For rayon cord, treated according to this invention, the drop in tensile strength after such a fatigue resistance test is very slight, whereas the loss of tensile strength of cotton cord under the same conditions is very substantial. Obviously this improved resistance to fatigue exhibited by rayon cord treated according to this invention is a great advantage in cord designed for use in tires, fan belts, and the like, which undergo constant and severe flexing, bending and stretching when in operation. Furthermore, the improvement in adhesion to rubber of rayon cord is even more marked at high temperatures of 270° F., for example, than at ordinary temperatures, a fact which is of the utmost importance in the construction of tires, fan belts and similar articles which develop very high temperatures under ordinary conditions of usage.

In order to illustrate this invention more clearly, the following examples are given. It is, of course, to be understood that the invention is not limited to these precise examples which are merely illustrative of the invention.

*Example I*

An aqueous solution is prepared containing 2% by weight of polyvinyl alcohol and 5% by weight of natural rubber latex solids. Cord made from viscose process rayon and of construction suitable for use in automobile tires, for example, cord made from rayon thread, said thread having a dry tenacity at room temperature (75° F.) of about 3 grams per denier and produced in accordance with the process taught by H. H. Parker in the copending application Serial No. 676,463, filed June 19, 1933, is passed through the solution of the example slowly enough to be thoroughly wet and is then dried at a temperature of 85° C. or higher by passage over heated rollers or by other suitable means and is then laid upon a thin sheet of compounded rubber stock and the whole subjected to sufficient temperature and pressure to completely vulcanize the rubber. After curing the rayon is found to adhere very firmly to the rubber so that a force is required to separate it which is at least twice as great as is required for bare untreated rayon and is approximately equal to or greater than that required in case of untreated cotton cord used in the manufacture of tires.

When rayon tire cord is passed through the following solutions, dried, applied to compounded rubber stock and the cord and rubber cured or vulcanized just as described in Example I a product is obtained exhibiting good adhesion between the rayon cord and rubber.

*Example II*

An aqueous solution containing 2% by weight of polyvinyl alcohol and 4% by weight of rubber latex solids containing suitable accelerators, vulcanizers, stabilizers, etc.

*Example III*

An aqueous solution containing 2.5% by weight of polyvinyl alcohol, 2% by weight of resorcinol, 1.6% by weight of formaldehyde (added as 2½ times that amount of 40% commercial formaldehyde) and 0.2% by weight of sodium hydroxide.

*Example IV*

An aqueous solution containing 1.8% by weight of polyvinyl alcohol, 1.7% by weight of resorcinol, 1.5% by weight of formaldehyde (added as 2½ times that amount of 40% commercial formaldehyde), 0.2% by weight of sodium hydroxide and 15% by weight of natural rubber latex solids.

A particularly good latext for use in accordance with the method described in the examples comprises a so-called creamed latex prepared by treating natural rubber latex with soap, ammonium alginate, and the like, creaming as by whipping or other vigorous agitation at a temperature of 70–90° C., skimming, and using the top portion which has been skimmed off. The creamed latex is then used in the same way as the various latices disclosed in the examples.

Instead of drying the cord at elevated temperatures as set forth in the preceding examples, the impregnated cord may be dried at room temperature or thereabouts, and subsequently vulcanized to the rubber at the customary temperature.

Parts and proportions are intended to be parts and proportions by weight, unless otherwise indicated.

Since it is obvious that many changes and modifications of the invention can be made within the nature and spirit thereof, it is understood that the invention is not to be limited thereto except as set forth in the appended claims.

I claim:

1. In the process of manufacturing reinforced rubber articles such as rubber tires and the like, the steps which comprise treating threads, cords, fabrics, and the like prepared from continuous regenerated cellulose filaments having a dry tenacity at room temperature of about two grams per denier with an aqueous solution containing, as essential bonding ingredients, polyvinyl alcohol, at least one other material capable of reacting with an aldehyde to form an infusible, insoluble resin, and sufficient aldehyde to react with said other material to form an infusible, insoluble resin, drying the threads, cords, fabrics, and the like so treated, associating the same with vulcanizable rubber and then subjecting the mass to a vulcanizing temperature.

2. In the process of manufacturing reinforced rubber articles such as rubber tires and the like, the steps which comprise treating threads, cords, fabrics, and the like prepared from continuous regenerated cellulose filaments having a dry tenacity at room temperature of above two grams per denier with an aqueous solution containing, as essential bonding ingredients, rubber latex together with polyvinyl alcohol, at least one other material capable of reacting with an aldehyde to form an infusible, insoluble resin, and sufficient aldehyde to react with said other material to form an infusible, insoluble resin, drying the threads, cords, fabrics, and the like so treated, associating the same with vulcanizable rubber and then subjecting the mass to a vulcanizing temperature.

3. In the process of manufacturing reinforced rubber articles such as rubber tires and the like, the steps which comprise treating threads, cords, fabrics, and the like prepared from continuous regenerated cellulose filaments having a dry tenacity at room temperature of above two grams per denier and obtained from viscose with an aqueous solution containing, as essential bonding ingredients, rubber latex together with polyvinyl alcohol, at least one other material capable of reacting with formaldehyde to form an infusible, insoluble resin, and sufficient aldehyde to react with said other material to form an infusible, insoluble resin, heating the threads, cords, fabrics, and the like so treated at a temperature sufficiently elevated to convert at least a portion of the resin-forming materials to an infusible, insoluble resin and to dry the polyvinyl alcohol contained therein, associating the same with vulcanizable rubber and then subjecting the mass to a vulcanizing temperature.

4. Vulcanized rubber articles such as rubber tires and the like reinforced with threads, cords, fabrics, and the like prepared from continuous regenerated cellulose filaments having a dry tenacity at room temperature of above two grams per denier, said threads, cords, fabrics, and the like being adhered to the vulcanized rubber in said articles by means of a composition comprising, as essential bonding ingredients, polyvinyl alcohol and an infusible, insoluble resin formed from an aldehyde and at least one other resin-forming component.

5. Vulcanized rubber articles such as rubber tires and the like reinforced with threads, cords, fabrics, and the like prepared from continuous regenerated cellulose filaments having a dry tenacity at room temperature of above two grams per denier, said threads, cords, fabrics, and the like being adhered to the vulcanized rubber in said articles by means of a composition comprising, as essential bonding ingredients, polyvinyl alcohol, rubber, and an infusible, insoluble resin formed from an aldehyde and at least one other resin-forming component.

WILLIAM HALE CHARCH.

CERTIFICATE OF CORRECTION.

Patent No. 2,211,945. August 20, 1940.

WILLIAM HALE CHARCH.

It is hereby certified that error appears in the printed specification of the above numbered patent requiring correction as follows: Page 4, second column, line 40, for "polyvingl" read --polyvinyl--; page 5, first column, line 15, for "latext" read --latex--; line 45, claim 1, for "about" read --above--; and that the said Letters Patent should be read with this correction therein that the same may conform to the record of the case in the Patent Office.

Signed and sealed this 8th day of October, A. D. 1940.

(Seal)

Henry Van Arsdale,
Acting Commissioner of Patents.